United States Patent [19]
Adachi

[11] Patent Number: 5,763,119
[45] Date of Patent: Jun. 9, 1998

[54] NON-AQUEOUS ELECTROLYTE SECONDARY CELL HAVING SHUTTLE AGENT

[75] Inventor: Momoe Adachi, Tokyo, Japan

[73] Assignee: Sony Corporation, Tokyo, Japan

[21] Appl. No.: 638,181

[22] Filed: Apr. 26, 1996

[30] Foreign Application Priority Data

Apr. 28, 1995 [JP] Japan .................................. 7-106401
Mar. 4, 1996 [JP] Japan .................................. 8-046351

[51] Int. Cl.$^6$ .................................................. H10M 10/40
[52] U.S. Cl. .......................... 429/199; 429/198; 429/194; 429/218
[58] Field of Search ........................ 429/194, 198, 429/218, 197, 199

[56] References Cited

U.S. PATENT DOCUMENTS

| | | | |
|---|---|---|---|
| 4,762,644 | 8/1988 | Kobayashi et al. | 252/500 |
| 4,808,497 | 2/1989 | Blomgren et al. | 429/194 |

FOREIGN PATENT DOCUMENTS

A-0 319 182  7/1989  European Pat. Off. .

OTHER PUBLICATIONS

Patent Abstracts of Japan, vol. 16, No.120 (E-1182), Mar. 26, 1992 & JP-A-03 289062 (Furukawa Battery Co. Ltd).
Patent Abstracts of Japan, vol. 17, No. 450 (E-1416) Aug. 18, 1993 & JP-A-05 101847 (Otsuka Chem. Co. Ltd).
Patent Abstracts of Japan, vol. 95, No. 3, Apr. 28, 1995 & JP-A-06 338347 (Sony Corp.), Dec. 6, 1994.

Primary Examiner—Stephen Kalafut
Assistant Examiner—Carol Chaney
Attorney, Agent, or Firm—Hill & Simpson

[57] ABSTRACT

In a non-aqueous electrolyte secondary cell according to the present invention, a particular redox shuttle is contained in an electrolyte, whereby an overcharge of the cell is effectively prevented. The non-aqueous electrolyte secondary cell comprising a negative electrode composed of a metal material containing lithium as a primary component or a carbonaceous material into which lithium can be doped and from which lithium can be dedoped, a positive electrode composed of a composite oxide of lithium and transition metal, and a non-aqueous electrolyte containing an organic compound of the general formula:

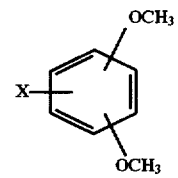

where X represents a halogen atom.

2 Claims, 3 Drawing Sheets

NON-AQUEOUS ELECTROLYTE SECONDARY CELL HAVING SHUTTLE AGENT

BACKGROUND OF THE INVENTION

1. Field of the Invention

This invention relates to a non-aqueous electrolyte secondary cell capable of generating an electro-motive force by an action of lithium ion, and more particularly to a technique for preventing an overcharging of the cell by using a so-called redox shuttle.

2. Prior Art

In a lithium secondary cell (non-aqueous electrolyte secondary cell), one of most important problems is to assure a safety thereof. Among them, the problem posed on the overcharge of the cell is significant.

For instance, it is known that a nickel-cadmium cell has a mechanism for preventing the overcharging of cells in which a charged energy is consumed by a chemical reaction of water occurring in association with increase in the charged voltage. On the other hand, in the case of the lithium-based secondary cell which is of a non-aqueous type, other types of mechanisms than those used in the nickel-cadmium cell are required.

Mechanisms hitherto proposed to prevent the overcharge of the lithium-based secondary cell, include two methods; one method in which a chemical reaction is used and the other method in which an electronic circuit is used. Practically, the latter method is predominantly employed.

However, such an overcharge-preventing method in which an electronic circuit is employed, is expensive. In addition, such a method has a further defect that various limitations are created in the course of product-designing for the cell.

Under these circumstances, attempts have been made to establish a technique for preventing the overcharge of the cell using a chemical reaction. One of such methods in which the overcharge of the non-aqueous cell is prevented by using a chemical reaction, is to add an adequate reduction-oxidation agent to an electrolyte solution. By this, if the reduction-oxidation agent has a good reaction reversibility, an effective overcharge-preventive mechanism is established because the agent can be freely moved between positive and negative electrodes of the cell to thereby consume an overcharged electrical current.

Such a reduction-oxidation agent is referred to as "redox shuttle" or the like. The method in which the redox shuttle is used to simplify the safety mechanism of the lithium-based secondary cell, is less expensive than those using the electronic circuit. Such a method has a further advantage that the safety mechanism used there does not cause deterioration of an energy density of the cell.

A possibility of applying the afore-mentioned redox shuttle to the lithium-based secondary cell has been already reported. For instance, In the case of 3 V-class calls, it is suggested that ferrocenes are useful for the overcharge-preventing purpose.

However, ferrocenes have a low oxidation-reduction potential of 3.1 V to 3.5 V relative to a lithium electrode. Therefore, ferrocenes are not applicable to cells having a higher cell voltage. For example, in the case of 4 V-Class cells such as carbon-LiCoO$_2$-type lithium-ion cell, it is necessary to use compounds having an oxidation-reduction potential of about 4.0 v to about 4.5 V.

As a result of further investigations, it has been revealed that, for instance, metal complexes of Fe, Ru or Ce as have a high oxidation-reduction potential and a high electrochemical stability and are therefore useful as a reduction-oxidation agents for the afore-mentioned 4 V-class lithium-ion secondary call. These agents has been proposed, for example, in Japanese patent application laid-open publication No. 6-338,347. These agents include a transition metal, as a central metal of the complexes, such as Fe, Ru or Ce. These transition metals can be maintained in various stable oxidation-reduction states depending upon conditions of (d) electron orbital or (f) electron orbital, so that an adequate ligand can be connected to the metal to form a solvated molecule. The afore-mentioned agents which can form such a solvated molecule are useful for controlling the oxidation-reduction potential and therefore suitable as redox shuttle.

However, the metal complexes or the cerium salts have such a structure that the large-size ligand is disposed around an electron orbital of the central metal, so that they show a large molecular weight and a large molecular volume.

As a result, in case that these agents are dissolved in an electrolyte solution, its concentration and diffusion rate in the electrolyte solution are limited to a particular range, which often leads to a problem that a sufficient overcharge-preventing effect cannot be obtained.

For instance, when a lithium ion is primarily concerned in the reaction occuring under the overcharge condition, it is general that the lithium ion is dissolved in an electrolyte solution at a concentration of about 1 mole per liter. Therefore, it is desirable to dissolve the oxidation-reduction agent in the electrolyte solution at a molar concentration corresponding to the molar concentration of the lithium ion.

If the metal complex or the cerium salt having such a large molecule weight is dissolved in the electrolyte solution, the agent occupies a large volume in the electrolyte solution so that a viscosity or other dissolving properties of the electrolyte solution are adversely affected. This results in deterioration in an ionic conductivity of the lithium ion. Thus, there is a limitation concerning the concentration of the oxidation-reduction agent used.

In addition, some of the afore-mentioned metal complexes have as large volume as one liter per one mole. If such metal complexes are used, it becomes impossible to prepare an electrolyte solution containing the reduction-oxidation agent at a molar concentration of one mole per liter.

Furthermore, in general, a large-volume molecule such as the metal complex or the cerium salt has a low diffusion rate in an electrolyte solution. If the large-volume oxidation-reduction agent having a lower diffusion rate than that of the lithium ion is used at a concentration lower than that of the lithium ion, it will be difficult to prevent an overcharge reaction of the lithium ion to a sufficient extent.

A current status is such that there exist no oxidation-reduction agents which can fulfill all the requirements for the redox shuttle, except the afore-mentioned defective agents.

OBJECT AND SUMMARY OF THE INVENTION

The present invention has been accomplished in view of the afore-mentioned problems encoutered in the prior art.

It is therefore an object of the present invention to provide a non-aqueous electrolyte secondary cell having an excellent safety and a high energy density by using an oxidation-reduction agent (redox shuttle) capable of exhibiting an optimum oxidation-reduction potential and an improved dissolving ability to an electrolyte solution and generating chemically stable oxidation- and reduction-species without causing deterioration in performance of the cell due to undesired side reactions.

In order to achieve the afore-mentioned objects, in accordance with the present invention, there is a non-aqueous electrolyte secondary cell comprising a negative electrode composed of a metal material containing lithium as a primary component or a carbonaceous material into which lithium can be doped and from which lithium can be dedoped, a positive electrode composed of a composite oxide of lithium and transition metal, and a non-aqueous electrolyte containing an organic compound of the general formula:

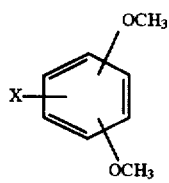

where X represents a halogen atom.

The compound of the afore-mentioned general formula has a chemical structure in which two methoxy substituent groups and one halogen group are bonded to a benzene ring. The compound acts as an oxidation-reduction agent because the methoxy substituent groups can function as an oxidation-reduction radical. Specifically, the compound has an oxidation-reduction potential suitable as a redox shuttle for 4 V-class cells. In addition, oxidation-species and reduction-species derived from the compound are chemically stable. Furthermore, the compound has a benzene ring as a basic skeleton having a molecular weight of 78. Thus, the compound has a relatively small molecular weight and molecular volume as compared with those of metal complexes such as metallocenes and polypyrizine complexes or cerium salts. This means that these compounds have a small volume occupancy and a high diffusion rate in the electrolyte solution. Therefore, properties of the electrolyte solution are not adversely affected by the addition of these compounds, so that a high mobility of the compounds in the electrolyte solution is maintained.

Accordingly, when the compounds are contained in a non-aqueous electrolyte solution of the secondary cell, an overcharged current generated in the cell is effectively consumed so that the cell can be protected from an excessive increase in cell voltage.

Meanwhile, it has been found that the compound in which the two methoxy substituent groups are bonded to the 1 and 2 positions or the 1 and 4 positions of its benzene ring, exhibits a particularly higher reversibility in the oxidation-reduction reaction as compared with the compound in which the substituents groups are bonded to the 1 and 3 positions of the benzene ring, though the latter compounds are also useful as a redox shuttle. The reason why the 1 and 3 position-substituted compound shows a relatively low reversibility in the oxidation-reduction reaction, is as follows.

That is, the 1, 3 and 5 positions of the benzene ring have a conjugated relation to each other. In consequence, if any electron located at the 1 position of the benzene ring is liberated therefrom, the lack of electron is compensated with those in an electron cloud located at the 3 or 5 position of the benzene ring. In this case, assuming that the two methoxy substituent groups are introduced to, for example, the 1 and 3 positions of the benzene ring and any of these methoxy substituent groups is concerned in the oxidation reaction of the compound, it will be easily suggested that, when the methoxy substituent group bonded to the 1 position of the benzene ring is oxidized, lack of electrons due to the oxidation is immediately compensated with those located at the 3 position whereby lack of electrons at the 3 position occurs. Such a condition in which both the methoxy substituent groups bonded to the 1 and 3 positions of the benzene ring are oxidized, is unstable. Accordingly, the compound in which the two methoxy substituent groups are bonded to the 1 and 2 positions or the 1 and 4 positions of the benzene ring can exhibit a relatively high reversibility in the oxidation-reduction reaction as compared with the compound in which those methoxy substituent groups are in the 1 and 3 positions.

These and other objects, features and advantages of the present invention will become more apparent from the following detailed description when read in conjunction with the accompanying drawings and the appended claims.

DETAILED DESCRIPTION OF THE INVENTION

Figure 1:
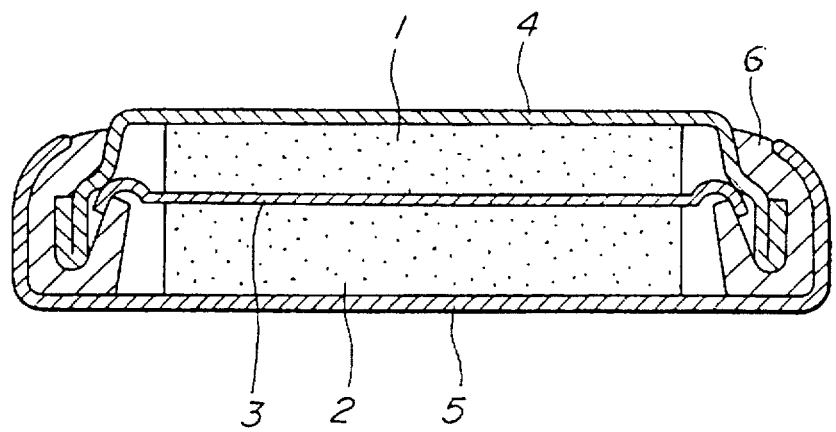
FIG. 1 is a sectional view of a cell according to one embodiment of the present invention.

The non-aqueous electrolyte secondary cell according to the present invention, includes a negative electrode made of a metal material containing lithium as a primary component or a carbonaceous material into which lithium can be doped and from which lithium can be dedoped, and a positive electrode made of a composite material of lithium and transition metal. The use of the negative and positive electrodes provides as much high a cell voltage as 4 V or more.

In the non-aqueous electrolyte secondary cell according to the present invention, in addition to the use of the afore-mentioned negative and positive electrodes, there is used a non-aqueous electrolyte containing the compound of the general formula:

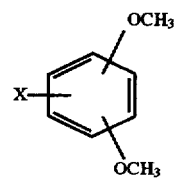

where X represents a halogen atom.

The non-aqueous electrolyte containing such a compound chemically consumes, in its oxidation-reduction reaction, a current generated due to overcharge of the cell, whereby it can serve as a redox shuttle. The specific properties of the compound are described in detail below.

The compound of the afore-mentioned general formula contains a benzene ring as a basic skeleton. When methoxy substituent groups are introduced to the benzene ring, the compound exhibits an oxidation-reduction potential suitable for a redox shuttle for 4 V-class cells, and generates oxidized species and reduced species both having a high stability to a chemical reaction.

That is, when a pair of electrons are shared by adjacent two atoms of an organic compound, a covalent single bond is principally formed therebetween. Accordingly, if one electron is removed from or added to an electron system of the bond by oxidation or reduction of the organic compound, an unpaired electron is generated in the compound. This unpaired electron is stabilized only by decomposition of the compound or bonding thereof with another compound. Accordingly, the organic compound having such an unpaired electron is principally unstable.

However, in case that the unpaired electron is present in a non-localized orbital such as $\pi$ orbital of an aromatic compound and shared by 2 or more atoms within its molecular structure, a chemical stability of the organic compound is not adversely affected by the existence of the unpaired electron. In this case, the oxidation-reduction potential of the compound is almost determined by a degree of the non-localization of the unpaired electron and a symmetry of the orbital for the unpaired electron. When the degree of the non-localization of the electron orbital is too large, an adequate level of the oxidation-reduction potential cannot be obtained. From this standpoint, organic compounds having, as a basic skeleton, an aromatic ring such as a benzene ring, which has a relatively small molecular weight, are suitable for a redox shuttle.

When the benzene ring has not only methoxy substituent groups but a halogen substituent group, the following advantages are attained.

That is, in general, the oxidation-reduction potential of the compound is almost determined by a basic skeleton of the molecular structure thereof as described above. When any substituent group is introduced to the basic skeleton, the oxidation-reduction potential of the compound is influenced by the nature of the substituent group introduced. If the substituent group is an electron attractive group, the oxidation-reduction potential is increased. On the contrary, if the substituent group is an electron donative group, the oxidation-reduction potential is decreased. In addition, when a plurality of substituent groups are introduced to the basic skeleton, it is known that the afore-mentioned effect on the oxidation-reduction potential is caused in a cumulative manner.

The introduction of the halogen sustituent group to the benzene ring causes increase in the oxidation-reduction potential of the compound. In an actual cell system, the oxidation-reduction potential of the compound is fluctuated by several hundred millivolts depending upon the kind of electrolyte used. However, the oxidation-reduction potential of the compound is finely adjusted by the effect of the halogen substituent group introduced to the benzene ring. As a result, the compound having the benzene ring to which the halogen substituent group is introduced shows an adequate oxidation-reduction potential irrespective of the kind of the electrolyte, so that it can suitably function as a redox shuttle.

Incidentally, the number of the methoxy substituent groups to be introduced to the benzene ring should be two per one molecule of the compound. If the benzene ring has only one methoxy substituent group, the compound cannot exhibit a sufficient oxidation-reduction effect so that an increased amount of the compound must be used to obtain a necessary oxidation-reduction effect.

As described above, the organic compound having the benzene ring to which two methoxy substituent groups and the halogen substituent group are introduced, can exhibit a sufficient oxidation-reduction potential suitable to be used as a redox shuttle for 4 V-class cells, and generates oxidized and reduced species having a high chemical stablility. In addition, such a compound does not cause undesired side reaction which adversely affects the performance of the cell. The benzene ring as the basic skeleton of the compound has a molecular weight of 78. Namely, not only the molecular weight but also the molecular volume of the compound are smaller than those of metal complexes such as metallocene and polypyridine complexes or cerium salts. This means that the compound has a low volume occupancy and a high diffusion rate in the electrolyte, so that the solvent characteristic of the electrolyte is not largely influenced by the existence of the compound whereby a good mobility of the compound in the electrolyte can be achieved.

Specific examples of such organic compounds may include 1, 4-di-methoxy-2-fluoro-benzene, 1, 3-di-methoxy-5-chloro-benzene, 3, 5-di-methoxy-1-fluoro-benzene, 1, 2-di-methoxy-4-fluoro-benzene, 1, 3-di-methoxy-4-bromo-benzene, 2, 5-di-methoxy-1-bromo-benzene, or the like.

Among them, the preferred organic compounds suitable for a redox shuttle are those having the two methoxy substituent groups which are bonded to the benzene ring at the 1 and 2 positions or the 1 and 4 positions.

EXAMPLES

The present invention is described in detail below by way of examples with reference to the accompanying drawings.

Example 1

FIG. 1 is a sectional view of a coin-shaped cell having an outer diameter of 20 mm and a height of 2.5 mm according to the present invention.

The coin-shaped cell was produced in the following manner.

Metal lithium as a negative electrode active ingredient 1 and $LiCoO_2$ as a positive electrode active ingredient 2 are filled into an upper and lower casings 4 and 5, respectively. The upper and lower casings 4 and 5 were mated with each other through a separator 3 formed from a porous polypropylene film, so as to form a laminate structure composed of layers of the negative electrode active ingredient 1 and the positive electrode active ingredient 2, and the separator 3 interposed therebetween. Separately, propylene carbonate and dimethyl carbonate were mixed with each other at a mixing ratio of 1:1 to prepare a mixture solvent. Dissolved into the mixture solvent were 1.0 mole of $LiPF_6$ and 100 ml of 1, 4-di-methoxy-2-fluoro benzene to obtain an electrolyte. The electrolyte was charged into a space formed between the upper and lower casings. Successively, the upper and lower casings were caulked together at their peripheral mating edges through a sealing gasket to form a hermetically sealed coin-shaped cell. Incidentally, when 1, 4-di-methoxy-2-fluoro-benzene was used as the component of the electrolyte, cyclic voltammetry revealed that a reversible oxidation-reduction reaction of the compound was caused in proximity of 4.2 V and 4.45 V relative to lithium.

Example 2

The procedure of Example 1 was repeated in the same manner as described above to produce a coin-shaped cell

7 except that 1, 2-di-methoxy-4-bromo-benzene was used in the electrolyte in place of 1, 4-di-methoxy-2-fluoro-benzene.

Example 3

The procedure of Example 1 was repeated in the same manner as described above to produce a coin-shaped cell except that 2, 5-di-methoxy-1-bromo-benzene was used in the electrolyte in place of 1, 4-di-methoxy-2-fluoro-benzene.

Example 4

The procedure of Example 1 was repeated in the same manner as described above to produce a coin-shaped cell except that 1, 2-di-methoxy-4-fluoro-benzene was used in the electrolyte in place of 1, 4-di-methoxy-2-fluoro-benzene.

Comparative Example 1

The procedure of Example 1 was repeated in the same manner as described above to produce a coin-shaped cell except that nothing was used in the electrolyte in place of 1, 4-di-methoxy-2-fluoro-benzene.

The thus-produced coin shaped cells were subjected to a charge/discharge cycle under an overcharged condition to examine change in voltage generated by the cells.

Meanwhile, the charge/discharge cycle was performed as follows. First, a constant-current charge was conducted at a current of 150 μA for 100 hours while the cell voltage was controlled so as not to exceed 4.5 V, followed by 10 hour interruption of the cycle. Successively, a constant-current discharge was conducted at a current of 150 μA until the cell voltage reached 4.5 V decreased to 2.7 V.

Figure 2:
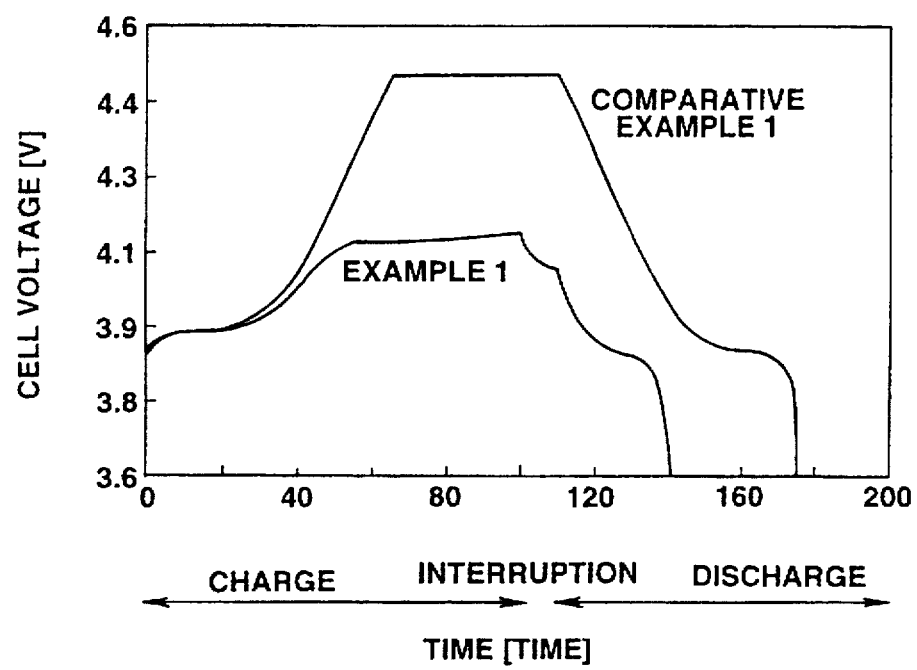
FIG. 2 is a graph showing a relation between cell voltage and elapsed time in a charge/discharge cycle, in which a cell employing an electrolyte containing 1, 4-di-methoxy-2-fluoro-benzene is compared with that employing an electrolyte without such a compound.
Figure 3:
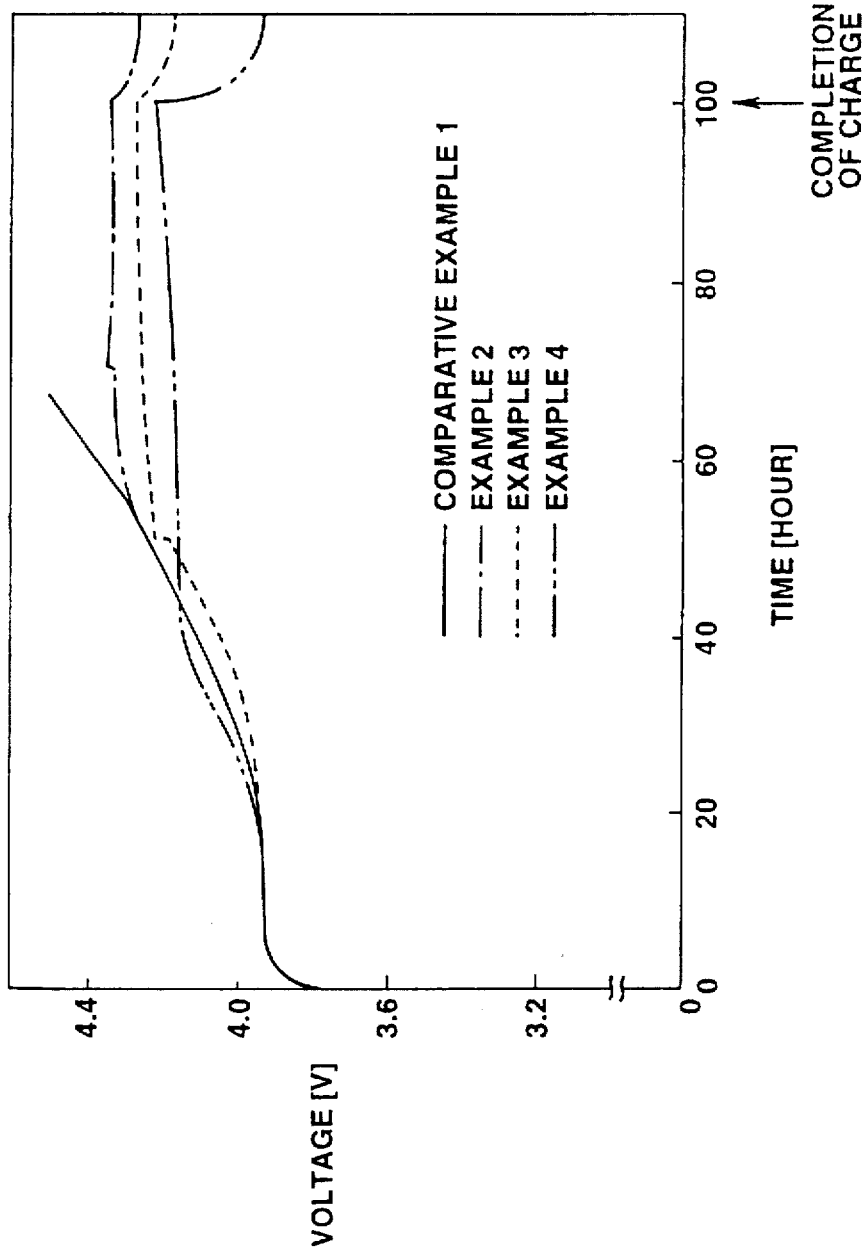
FIG. 3 is a graph showing a relation between cell voltage and elapsed time in a charge/discharge cycle, in which a cell employing an electrolyte containing 1, 2-di-methoxy-4-bromo-benzene, 2, 5-di-methoxy-1-bromo-benzene or 1, 2-di-methoxy-4-fluoro-benzene is compared with that employing an electrolyte without such a compound.
Figure 4:
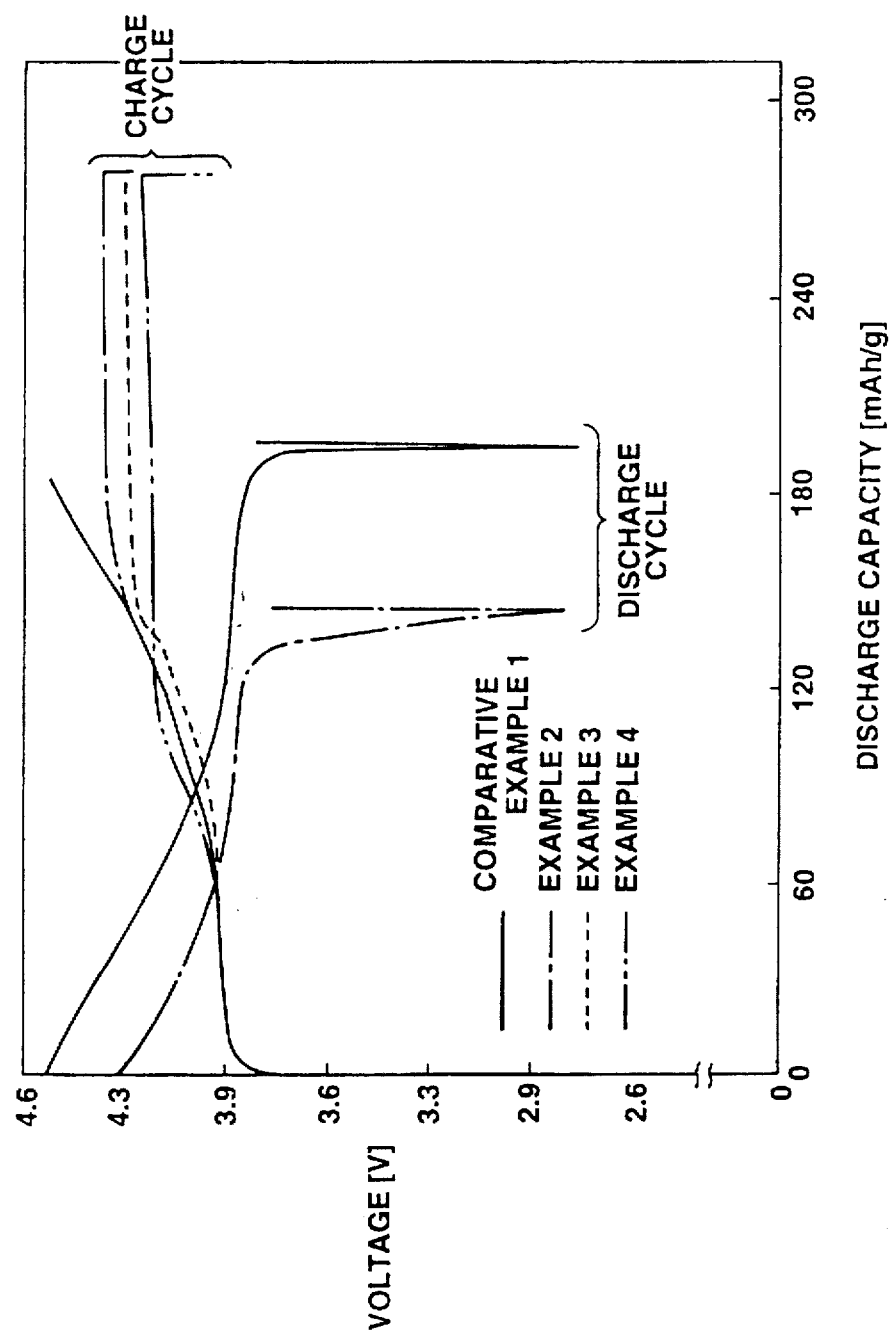
FIG. 4 is a graph showing a relation between cell voltage and discharge capacity in a charge/discharge cycle, in which a cell employing an electrolyte containing 1, 2-di-methoxy-4-bromo-benzene, 2, 5-di-methoxy-1-bromo-benzene or 1, 2-di-methoxy-4-fluoro-benzene is compared with that employing an electrolyte without such a compound.

The change in the cell voltage obtained in the afore-mentioned charge/discharge cycle are shown in FIGS. 2 and 3. FIG. 4 shows a relation between the cell capacity and the voltage. FIG. 2 shows the measurement data obtained in Example 1 and Comparative Example 1. FIGS. 3 and 4 comparatively show the measurement data obtained in Examples 2 to 4 and Comparative Example 1.

In the afore-mentioned charge/discharge cycle, the cell of Comparative Example 1 exhibited considerable increase in the cell voltage during the charging step so that the cell voltage reached the upper limit of the cell voltage (overcharged condition). Whereas, in the cell of Example 1, the increase in the cell voltage was observed until it reached 4.1 V but thereafter almost no increase in the cell voltage was observed. This was because the addition of 1, 4-di-methoxy-2-fluoro-benzene to the electrolyte caused consumption of a current generated due to the overcharge, whereby a further increase in the cell voltage was suppressed. Incidentally, the constant cell voltage thus achieved by the addition of the redox shuttle is called a shuttle voltage (relaxation voltage).

On the other hand, in the discharge cycle, the cell of Example 1 showed rapid decrease in the cell voltage to the lower limit of 2.7 V as compared with that of Comparative Example 1. At this time, the discharge capacity was about 110 mAh/g. This discharge capacity approximately corresponded to that obtained when the cell was charged to 4.05 V relative to a standard cell.

The cell of Comparative Example 1 showed slow decrease in the cell voltage to the lower limit of 2.7 V, so that the discharge capacity of the cell was larger than 140 mAh/g as a standard discharge capacity of the afore-mentioned standard cell. This was because the cell of Comparative Example 1 was overcharged in the charge cycle.

As described above, it was ascertained that 1, 4-di-methoxy-2-fluoro-benzene was useful to prevent the overcharge of the cell. In addition, since the discharge capacity

8 of the cell to which 1, 4-di-methoxy-2-fluoro-benzene was added, was in consistent with the standard discharge capacity, it was confirmed that 1, 4-di-methoxy-2-fluoro-benzene did not adversely affect the discharge capacity of the cell at all.

FIG. 3 shows the change in cell voltage measured for the cells of Examples 2 to 4 and Comparative Example 1 in the charge cycle. As appreciated from FIG. 3, in the cells of Examples 2 to 4, the increase in cell voltage was observed until it was raised to the oxidation-reduction potential of the redox shuttle but no further increase of the cell voltage was subsequently recognized. Particularly, the cell voltage of the cell of Example 2 was maintained at an optimum constant level slightly higher than 4.2 V.

Furthermore, FIG. 4 shows the relation between a discharge capacity and a cell voltage which was obtained in the charge cycle of the cells of Examples 2 to 4 and Comparative Example 1. FIG. 4 also shows the relation between a discharge capacity and a cell voltage which was obtained in the discharge cycle of the cells of Example 2 and Comparative Example 1. As appreciated from FIG. 4, the cells of Examples 2 to 4 whose cell voltages were maintained at the constant level in the charge cycle by the addition of the redox shuttle, had a discharge capacity almost identical to or extremely approximate to a theoretical value.

Meanwhile, the shuttle voltages and the discharge capacities, which are plotted in FIGS. 2, 3 and 4, and theoretical values of the discharge capacities calculated based on the shuttle voltages, are shown in Table 1.

TABLE 1

| Example No. | Shuttle voltage (V) | Discharge capacity (mAh/g) | Theoretical value of discharge capacity (mAh/g) |
|---|---|---|---|
| Example 1 | 4.04 | 92 | 106.2 |
| Example 2 | 4.27 | 146 | 147.6 |
| Example 3 | 4.17 | 126 | 131.2 |
| Example 4 | 3.93 | 92 | — |

As understood from Table 1, it was confirmed that 1, 2-di-methoxy-4-bromo-benzene, 2, 5-di-methoxy-1-bromo-benzene and 1, 2-di-methoxy-4-fluoro-benzene provided an optimum mechanism for preventing the overcharge of the cell and did not adversely affect functions of electrodes of the cell, similar to 1, 4-di-methoxy-2-fluoro-benzene.

Furthermore, 1, 3-di-methoxy-5-chloro-benzene, 3, 5-di-methoxy-1-fluoro-benzene and 1, 3-di-methoxy-4-bromo-benzene were dissolved in the electrolytes of the respective cells in place of 1, 4-di-methoxy-2-fluoro-benzene. The cells were subjected to the charge/discharge cycle test in the same manner as described above. As a result, the cell voltages were maintained at a constant level ranging from about 4.05 V to 4.4 V and the discharge capacities thereof were also maintained at an adequate level which corresponds to those obtained for the cell charged to the afore-mentioned voltages and ranges from 110 mAh/g to 140 mAh/g. This indicates that these compounds were also useful to provide an effective mechanism for preventing the overcharge of the cell.

Studies on Positions of Methoxy Substituent Groups in Redox Shuttle:

Next, positions of methoxy substituent groups introduced to the benzene ring were examined from a standpoint of reversibility of the redox shuttle. 1, 2-di-methoxy-4-bromo-benzene (1, 2-diMe-4-BrB), 1, 2-di-methoxy-4-fluoro-benzene (1, 2-diMe-4-FB), 3, 5-di-methoxy-1-chloro-benzene (3, 5-diMe-1ClB), 3, 5-di-methoxy-1-fluoro-benzene (3, 5-diMe-1-FB), 2, 4-di-methoxy-1-bromobenzene (2, 4-diMe-1-BrB), 2, 5-di-methoxy-1-bromo-benzene (2, 5-diMe-1-BrB) and 1, 4-di-methoxy-2-fluorobenzene (1, 4-diMe-2-FB) were respectively dissolved at a molar concentration of 100 mM in an electrolyte which was prepared by dissolving $LiPF_6$ at a molar concentration of 1.0M in a mixture solvent composed of propylene carbonate and dimethyl carbonate at a mixing volume ratio of 1:1. The thus-obtained electrolytes were subjected to a cyclic voltammetry using a three-pole cell.

Meanwhile, platinum plates were used as a working electrode and a counter electrode while a stainless steel plate to which metal lithium was adhered, was used as a reference electrode. The sweep rate was 20 mV/s. Threshold potential, $E_p$, $E_{p/2}$ and $E_p-E_{p/2}$, which were measured by a cyclic voltammograph, and presence of a reduction current corresponding to an oxidation current are shown in Tables 2 and 3.

Incidentally, the threshold potential means a potential at which a current starts to flow in case that the potential is swept. The threshold potential is a useful criterion to know an oxidation-reduction potential. In Tables 2 and 3, in the case where two threshold potentials appear in one row, this indicates that two oxidation currents were recognized. "$E_p$" represents a potential at which a peak value of the oxidation or reduction potential is obtained. "$E_{p/2}$", represents a potential at which one-half of the current at "$E_p$" is caused to flow. "$E_p-E_{p/2}$" can be used as an index of the oxidation-reduction reversibility. In general, in case that the compound has a good oxidation-reduction reversibility, "$|E_p-E_{p/2}|=0.0565/n(V)$" can be established.

TABLE 2

| Structural formula | Threshold potential | Presence of reduction current | $E_p$ | $E_{p/2}$ | $E_p - E_{p/2}$ |
|---|---|---|---|---|---|
| 1,2-diMe-4-BrB | 4.2 V, 4.5 V | YES | 4.62 V | 4.57 V | 0.05 V |
| 1,2-diMe-4-FB | 4.15 V, 4.45 V | YES | 4.52 V | 4.46 V | 0.06 V |
| 3,5-diMe-1-ClB | 4.3 V | NO | — | — | — |
| 3,5-diMe-1-FB | 4.4 V | NO | — | — | — |

TABLE 3

| Structural formula | Threshold potential | Presence of reduction current | $E_p$ | $E_{p/2}$ | $E_p - E_{p/2}$ |
|---|---|---|---|---|---|
| 2,4-diMe-1-BrB | 4.4 V | NO | — | — | — |

TABLE 3-continued

| Structural formula | Threshold potential | Presence of reduction current | $E_p$ | $E_{p/2}$ | $E_p - E_{p/2}$ |
|---|---|---|---|---|---|
| 2,5-diMe-1-BrB (OCH₃, Br, OCH₃) | 4.25 V, 4.4 V | YES | 4.52 V | 4.46 V | 0.06 V |
| 1,4-diMe-2-FB (OCH₃, F, OCH₃) | 4.1 V, 4.4 V | YES | 4.53 V | 4.47 V | 0.06 V |

As apparently appreciated from Tables 2 and 3, it was confirmed that the compound having methoxy substituent groups at the 1, 2-positions or the 1, 4-positions showed low oxidation-reduction potential thereof but high reversibility of a reduction current thereof. Accordingly, it was recognized that suitable oxidation-reduction agents (redox shuttle) were those having a halogen substituent group and two methoxy substituent groups introduced to the benzene ring at the 1, 2-positions or the 1, 4-positions.

What is claimed is:

1. A non-aqueous electrolyte secondary cell comprising:

a negative electrode composed of a metal material containing lithium as a primary component or a carbonaceous material into which lithium can be doped and from which lithium can be dedoped;

a positive electrode composed of a composite oxide of lithium and transition metal; and a non-aqueous electrolyte containing an organic compound of the general formula:

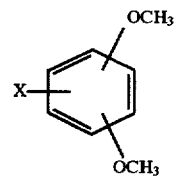

where X represents a halogen atom.

2. The non-aqueous electrolyte secondary cell as claimed in claim 1, wherein said organic compound has a benzene ring to which two methoxy substituent groups are introduced at the 1, 2-positions or the 1, 4-positions.

* * * * *